(12) United States Patent
Tobias

(10) Patent No.: US 6,779,222 B2
(45) Date of Patent: Aug. 24, 2004

(54) WINDSHIELD WIPER AND WINDSHIELD HEATING COMBINATION DEVICE

(76) Inventor: Roy H. Tobias, 6497 W. 75th Dr., Arvada, CO (US) 80003

( * ) Notice: Subject to any disclaimer, the term of this patent is extended or adjusted under 35 U.S.C. 154(b) by 0 days.

(21) Appl. No.: 10/196,469

(22) Filed: Jul. 17, 2002

(65) Prior Publication Data

US 2004/0010880 A1 Jan. 22, 2004

(51) Int. Cl.[7] .............................. B60S 1/38; B60S 1/32
(52) U.S. Cl. .................................... 15/250.07; 219/202
(58) Field of Search ........................ 15/250.05, 250.06, 15/250.07, 250.08, 250.09; 219/202, 203

(56) References Cited

U.S. PATENT DOCUMENTS

| | | | | |
|---|---|---|---|---|
| 2,627,011 A | * | 1/1953 | Eaves ....................... | 15/250.07 |
| 2,654,016 A | * | 9/1953 | Martin ..................... | 15/250.07 |
| 3,034,166 A | * | 5/1962 | Bell ......................... | 15/250.07 |
| 3,639,938 A | * | 2/1972 | Golden ..................... | 15/250.06 |
| 4,497,083 A | * | 2/1985 | Nielsen et al. ........... | 15/250.06 |
| 5,632,058 A | * | 5/1997 | Stanak ..................... | 15/250.04 |
| 5,832,558 A | * | 11/1998 | Ehret et al. .............. | 15/250.06 |
| 6,058,554 A | * | 5/2000 | Warren .................... | 15/250.06 |

FOREIGN PATENT DOCUMENTS

| | | | | |
|---|---|---|---|---|
| DE | 2218356 | * | 10/1973 | .............. 15/250.06 |
| JP | 0291252 | * | 12/1986 | .............. 15/250.06 |

* cited by examiner

Primary Examiner—Gary K. Graham

(57) ABSTRACT

A windshield wiper and windshield heating combination device for resisting ice and snow accumulation includes an arm assembly and a blade attached to the arm assembly. The blade includes a resiliently elastic material. A heating assembly is coupled to the windshield wiper. The heating assembly includes a heating element that is embedded in, or attached to, and generally extends along a length of the blade. An electrical wire is electrically coupled to the heating element. A power supply is electrically coupled to the electrical wire.

1 Claim, 3 Drawing Sheets

WINDSHIELD WIPER AND WINDSHIELD HEATING COMBINATION DEVICE

BACKGROUND OF THE INVENTION

1. Field of the Invention

The present invention relates to heated windshield wiper assemblies and more particularly pertains to a new heated windshield wiper assembly for resisting ice and snow accumulation when traveling in cold weather.

2. Description of the Prior Art

The use of heated windshield wiper assemblies is known in the prior art. U.S. Pat. No. 5,412,177 describes a removable heated cover for a windshield wiper blade assembly for preventing the formation of ice on the wiper blade assembly. Another type of heated windshield wiper assembly is U.S. Pat. No. 6,100,499 having a heated and lighted wiper assembly used by motor vehicle drivers under conditions such as freezing rain, sleet or snow. U.S. Pat. No. 4,670,933 describes a heated windshield wiper assembly that facilitates the efficiency of wiping a vehicles windshield. Other related patents are as follows U.S. Pat. Nos. 4,928,344, 5,787,543, 4,497,083, 5,831,242, U.S. Pat. No. Des. 345,329, and U.S. Pat. No. 5,572,765.

While these devices fulfill their respective, particular objectives and requirements, the need remains for a system that could easily be attached to the existing rubber wiper blades.

SUMMARY OF THE INVENTION

The present invention meets the needs presented above by utilizing spaced clips for holding the heating element against the sides of the wipers.

Another object of the present invention is to provide a new heated windshield wiper assembly that would provide an added measure of safety by enabling a full view to be maintained through the windshield in the winter.

Still another object of the present invention is to provide a new heated windshield wiper assembly that would allow the user to easily adjust the heating effect by varying the electrical power delivered to the heating elements.

To this end, one embodiment of the present invention generally comprises a windshield wiper including an arm assembly. A blade is attached to the arm assembly. The blade includes a resiliently elastic material. A heating assembly is coupled to the windshield wiper. The heating assembly includes a heating element that is embedded in and generally extends along a length of the blade. An electrical wire is electrically coupled to the heating element. The electrical wire extends through a length of the arm assembly. A power supply is electrically coupled to the electrical wire.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
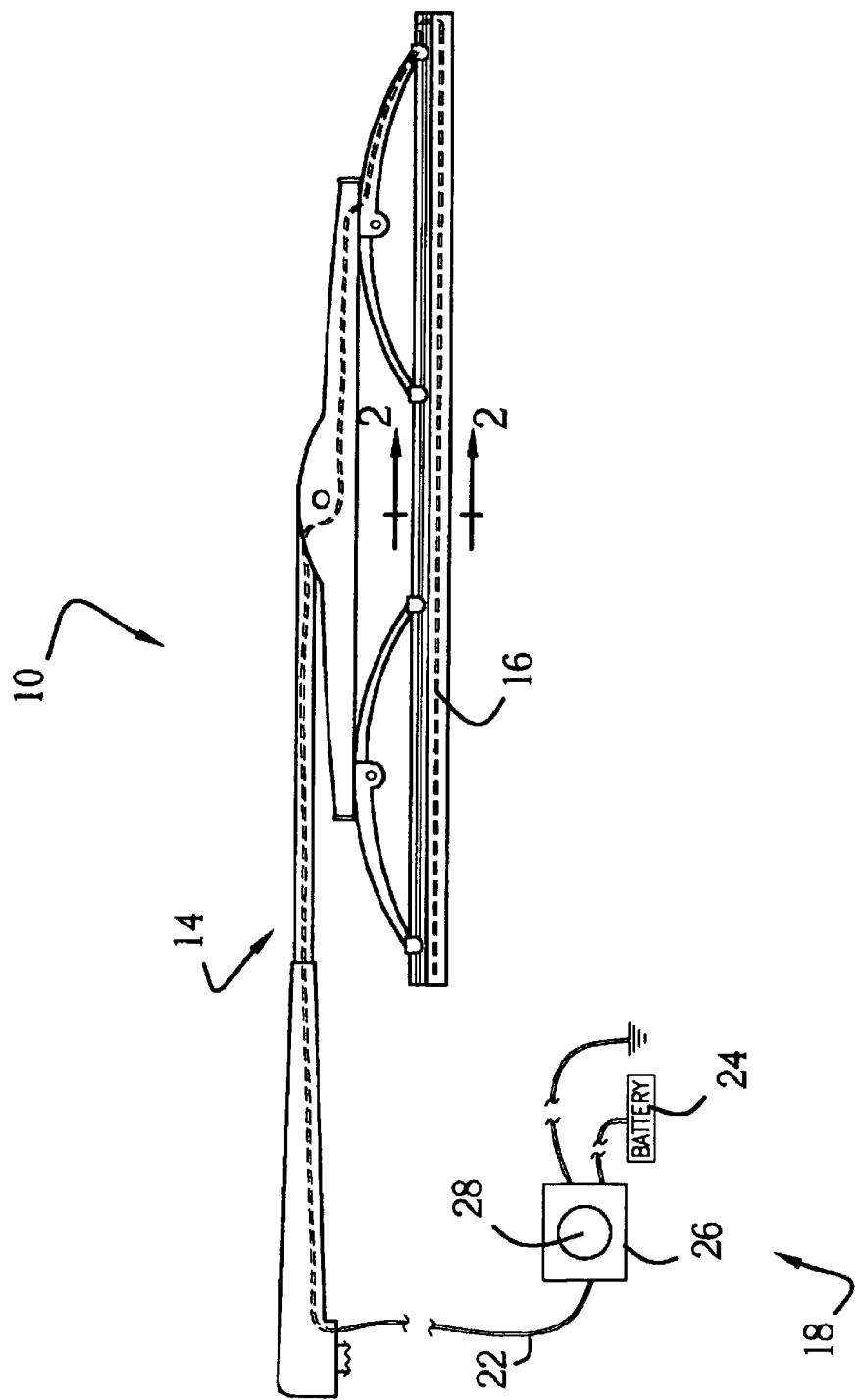
FIG. 1 is a side view of a windshield wiper and windshield heating combination device according to the present invention.

With reference now to the drawings, and in particular to FIGS. 1 through 4 thereof, a new heated windshield wiper assembly embodying the principles and concepts of the present invention and generally designated by the reference numeral 10 will be described.

As best illustrated in FIGS. 1 through 4, windshield wiper and windshield heating combination device 10 generally comprises a windshield wiper 12 including an arm assembly 14. A blade 16 is attached to the arm assembly 14. The blade 16 includes a resiliently elastic material. A heating assembly 18 is coupled to the windshield wiper 12. The heating assembly 18 includes a heating element 20 that is embedded in and generally extends along a length of the blade 16. An electrical wire 22 is electrically coupled to the heating element 20. The electrical wire 22 extends through a length of the arm assembly 14. A power supply 24 is electrically coupled to the electrical wire 22. The power supply 24 is the car battery. A switch 26 is electrically coupled to the electrical wire 22 for selectively supplying power to the heating element 20. The switch 26 may be mounted on a dashboard of a vehicle and may include a rheostat 28 for altering the heat output of the heating element 20.

Figures 2, 4:
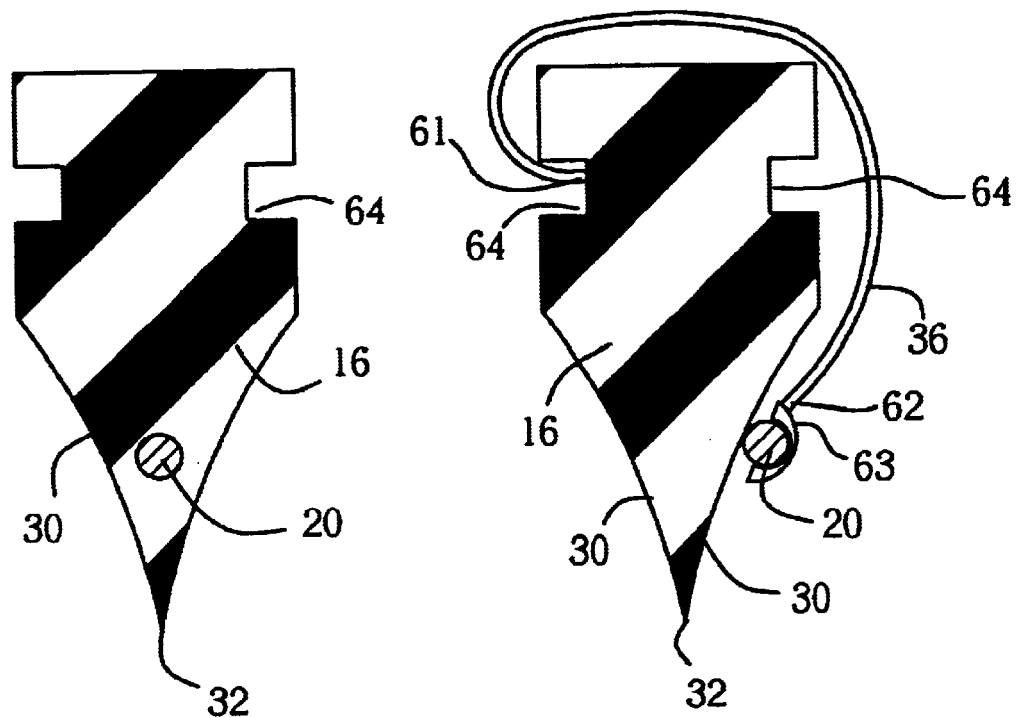
FIG. 2 is a cross-sectional view of FIG. 1 of the present invention.
FIG. 4 is a cross-sectional view taken along line 4—4 of FIG. 3 of the second embodiment of the present invention.
Figure 3:
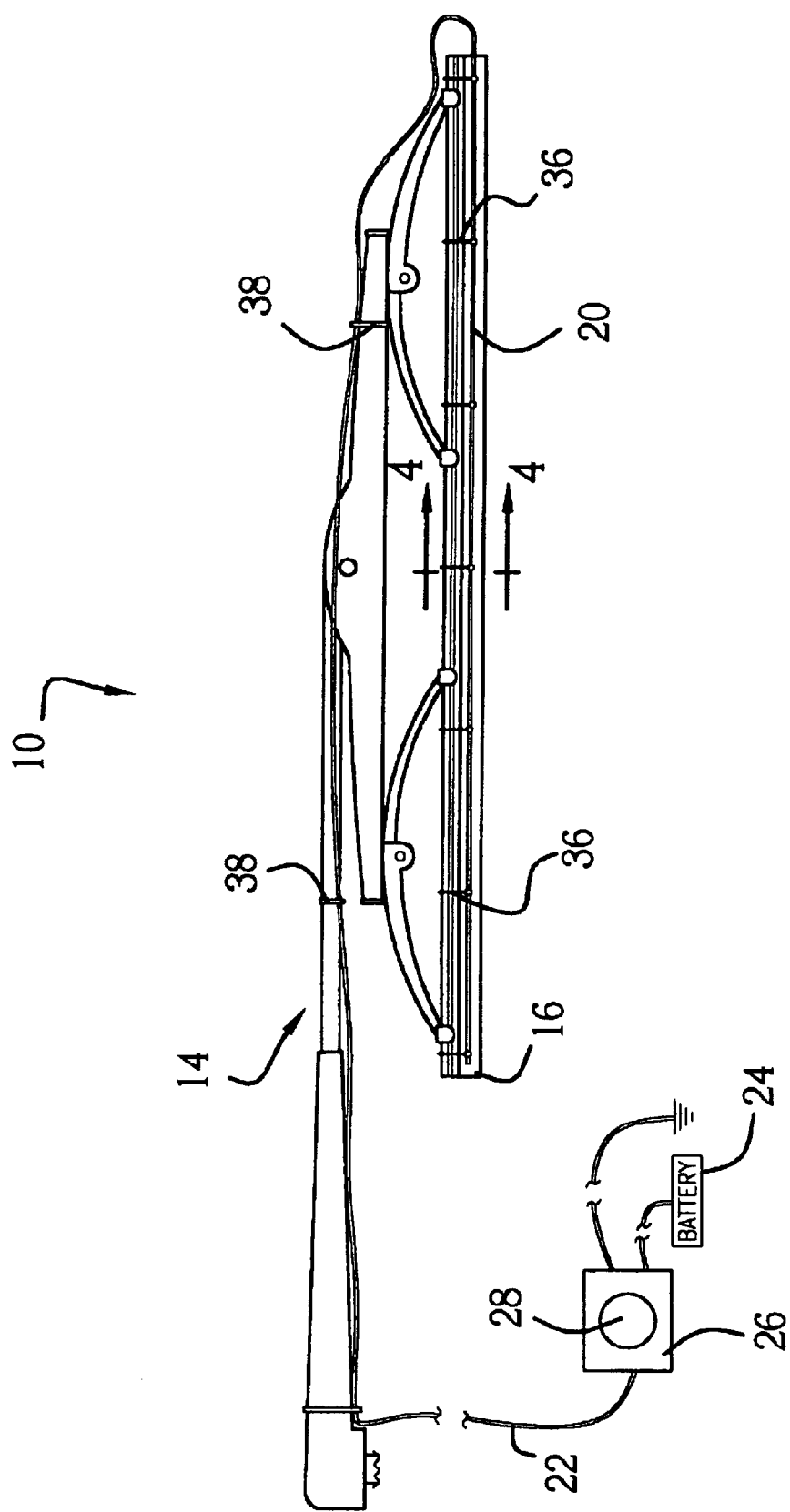
FIG. 3 is a side view of a second embodiment of the present invention.

A second embodiment of a windshield wiper heating device 10, shown in FIGS. 3 and 4, may be removably attached to a windshield wiper 12. The second embodiment of the windshield wiper heating device 10 is designed to be retrofitted to a vehicles existing windshield wipers 12. The windshield wiper 12 includes an arm assembly 14 and a blade 16 attached to the arm assembly 14. The blade 16 has a pair of side 30 leading to a bottom edge 32. Each of the sides has slot 64 therein. The device includes a heating assembly 18 that is removably coupled to the windshield wiper 12. The heating assembly 18 includes a heating element 20 that is positioned adjacent to and extends along a length of a first of the slots 64. A plurality of clips 36 removably secures the heating element 20 to the blade 16. Each of the clips 36 is elongated and has a first end 61 and a second end 62. A plurality of gripping members 63 is provided for selectively engaging the heating element 20. Each of the gripping members 63 is attached to one of the second ends 62. Each of the first ends 61 is positioned in a second of the slots 64 such that the clip, extends over an upper surface of the blade 16. An electrical wire is electrically coupled to the heating element 20. The electrical wire 22 extends along a length of the arm assembly 14. A plurality of bands 38 is for removably securing the electrical wire 22 to the arm assembly 14. A power supply 24 is electrically coupled to the electrical wire 22. A switch 26 is electrically coupled to the electrical wire 22 for selectively supplying power to the heating element 20.

In use, a user would activate the switch 26 in freezing weather and the electric heating element 20 would begin warming the wiper blade 16. This would melt any ice or snow that may have accumulated on the blade 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windshield wiper heating device removably attached to a windshield wiper, the windshield wiper including an arm assembly and a blade being attached to the arm assembly, the blade being of resiliant, elastic material and having pair of sides leading to a bottom edge, each of the sides having a slot therein, said device comprising:

a heating assembly being removably coupled to the windshield wiper, said heating assembly including;

a heating element extending along and adjacent to a length of a first of the slots and in contact with said material, a plurality of clips removably securing said heating element to the blade, each of said clips being elongated and having a first end and a second end, each of said clips having a gripping member attached to said second end for selective engaging said heating element, ends, each of said first and having a terminus positioned in a second of the slots such that each said clip extends over an upper surface of the blade;

an electrical wire being electrically coupled to said heating element, said electrical wire extending along a length of said arm assembly, a plurality of bands removably securing said electrical wire to the arm assembly;

a power supply being electrically coupled to said electrical wire; and a switch being electrically coupled to said electrical wire for selectively supplying power to said heating element.

\* \* \* \* \*